United States Patent

Gibson

[11] Patent Number: 6,136,061
[45] Date of Patent: Oct. 24, 2000

[54] NANOSTRUCTURED METAL COMPACTS, AND METHOD OF MAKING SAME

[76] Inventor: Charles P. Gibson, 2840 Fox Tail La., Oshkosh, Wis. 54904

[21] Appl. No.: 08/565,793

[22] Filed: Dec. 1, 1995

[51] Int. Cl.[7] .................................................. C22C 33/00
[52] U.S. Cl. ............................... 75/231; 75/246; 419/62; 419/65; 419/66
[58] Field of Search ........................ 75/246, 231; 419/62, 419/66, 65

[56] References Cited

U.S. PATENT DOCUMENTS

| | | |
|---|---|---|
| 3,368,883 | 2/1968 | Barnett et al. . |
| 3,494,760 | 2/1970 | Ginder . |
| 4,744,943 | 5/1988 | Timm ......................................... 419/10 |
| 4,771,022 | 9/1988 | Block et al. .............................. 501/103 |
| 4,921,666 | 5/1990 | Ishi ............................................ 419/25 |
| 5,009,706 | 4/1991 | Sakamoto et al. ........................ 75/244 |
| 5,147,446 | 9/1992 | Pechenik et al. .......................... 75/230 |
| 5,403,375 | 4/1995 | Konig et al. ............................... 75/255 |

*Primary Examiner*—Ngoclan Mai

[57] ABSTRACT

The present invention provides for nanostructured metal compacts exhibiting a preferred grain orientation formed from nanosize metal particles, preferably having anisometric morphology. The compact may comprise a single-phase metal powder, that is, a metal powder comprised of a single element, or may be an alloy, or the metal powder may be admixed with another component thereby resulting in a compact exhibiting heterogenous properties. The metal particles are fabricated or compacted, as by a powder metallurgical process, utlizing a relatively high pressure sufficient to form a compact, object, body, article, product or the like, with desired integrity and desity. The particles tend to become oriented with their largest dimension perpendicular to the direction of the applied force. Compaction occurs at about ambient temperature, but may be at subambient or elevated temperatures provided this temperature variation is not deleterious to the grain structure of the compact.

22 Claims, 3 Drawing Sheets

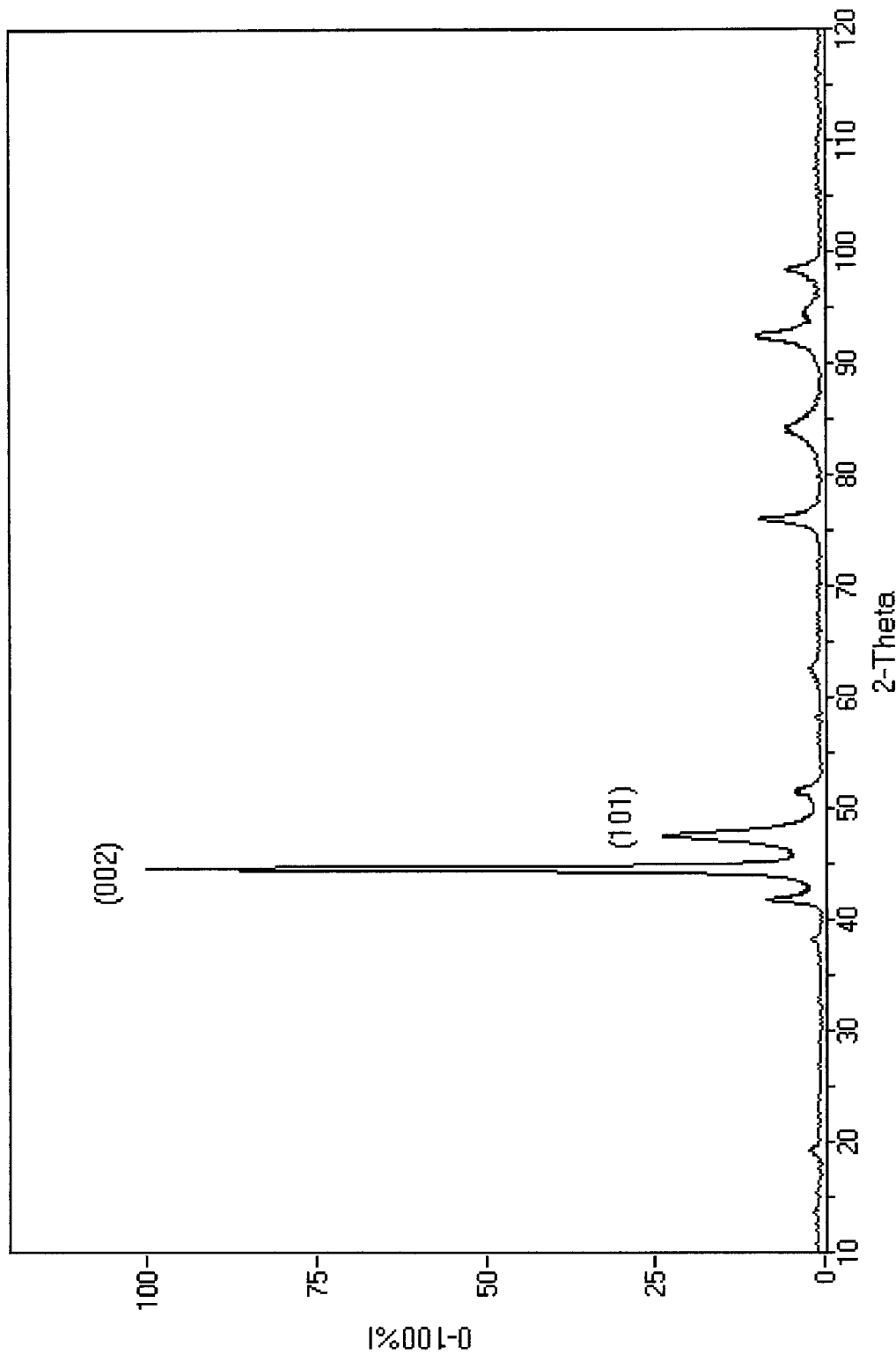

NANOSTRUCTURED METAL COMPACTS, AND METHOD OF MAKING SAME

FIELD OF THE INVENTION

This invention relates to nanostructured metal compacts, and to the method of making same. In its more specific aspect, this invention relates to nanostructured metal compacts which are fabricated or formed, as by a powder metallurgical process, from nanosize metal particles, and which exhibit a preferred grain orientation.

BACKGROUND OF THE INVENTION

It has long been recognized that the physical properties of a bulk metal object are influenced by its grain structure. For this reason, a great deal of effort has been devoted to finding ways to control grain structure in fabricated metal objects, and a great many examples of this can be found in the literature. However, the vast majority of these methods involve control of grain structure in cast objects, or in objects that are first cast and then worked (e.g., forged metal objects). For these methods of fabrication, there is a practical lower limit for grain size, that being on the order of about 1000 nanometers (i.e., 1 micron). Recently, it has been recognized that metal objects with grain size smaller than 1000 nanometers (nm) may exhibit unique properties due to the disproportionate number of atoms near grain boundaries, and due to "quantum effects" (e.g., incomplete band structure) that can only be observed for grains or particles smaller than about 1000 nm. Objects with grain size smaller than 1000 nm have come to be known as nanostructured objects.

Since conventional casting methods give metal objects with relatively large grains, new technologies have been developed to make nanostructured metal objects. The most successful of these methods is the rapid solidification rate (RSR) process, in which a thin stream of molten alloy is poured onto a rapidly spinning cooled wheel so that a very thin (10–50 micron) ribbon is formed. Because the ribbon is so thin, and because it is cast onto a cold surface, the ribbon cools at an extraordinary rate. This limits the growth of the metal grains within the ribbon, usually to a size less than 1000 nm. In addition to limiting the grain size in the ribbon, the RSR process can also produce ribbons in which the grains adopt a preferred grain orientation. This means that the crystallographic axes of the grains are not oriented randomly, but rather have adopted a preferred orientation with respect to some external reference. This feature is very useful because metal objects with preferred grain orientation may exhibit anisotropic physical properties, such as anisotropic electrical conductivity, anisotropic magnetic behavior, etc. In other words the physical properties of the object exhibit a "preferred orientation" because the grains adopt a preferred grain orientation. However, while the RSR process can produce nanostructured metals which exhibit preferred grain orientation, it should be noted that the process is limited to the production of very thin ribbons.

The use of thin nanostructured ribbons produced by the RSR process in the construction of larger objects, primarily permanent magnets, has been explored and is described in a recent review by Kuhrt (*Intermetallics*, Volume 3, pp 255–263, 1995). In most cases, the ribbons are crushed into relatively large particles (ca. 1 to 10 microns), which are then placed in a mold or die. A preferred grain orientation is established by aligning the particles magnetically. The particles are then compacted, and finally sintered. It should be noted that, in most cases, magnetic alignment is essential for producing an object with preferred grain orientation as the crushed particles are isometric (i.e. having approximately the same width in any direction, such as a sphere) and therefore cannot be aligned by mechanical methods. An exception to this, however, is disclosed in U.S. Pat. No. 5,009,706 to Sakamoto et al., in which a mechanical alignment is described. Notwithstanding the fact that this disclosure discusses grains that are smaller that 1000 nm in size, it is clear that the compact itself is formed from relatively large particles which polycrystalline, and which are between 10 and 1500 microns in size (see column 7, lines 16 through 27).

It should be emphasized that the cases cited by Kuhrt and by Sakamoto et al. all involve the formation of metal compacts from powders which consist of relatively large (i.e., greater that 1 micron) particles that are polycrystalline. In other words, the compacts are formed from large particles, each of which is composed of a large number of grains. The individual particles may themselves be nanostructured (i.e., have grains smaller that 1000 nm), but the particles comprising the compact are large.

A fundamentally different type of compact would be one formed directly from metal particles which are smaller than 1000 nm. Metal particles smaller than 1000 nm, which are referred to as nanosize particles, usually consist of a single grain. Thus, the significant difference between these compacts and the compacts described by Kuhrt and Sakamoto et al. is that the compacts formed from nanosize particles consist primarily of compacted single grains, whereas the compacts described by Kuhrt and by Sakamoto et al. are comprised of large polycrystalline particles. Advantages of making compacts from nanosize particles include improved control of the grain structure in the compact formed from nanosize particles, and the ability to make compacts with unique composition from mixtures of nanosize particles.

The formation of compacts, including metal compacts, directly from nanosize particles has been discussed in a recent review by Dowding et al. (*Advances in Powder Metallurgy & Particulate Materials,* Volume 5, Metal Powder Industries Federation, 1994). Dowding et al. point out that this approach has not been extensively explored because of the difficulty in producing nanosize powders in adequate quantities. Recent reviews of methods for producing nanosize particles are presented in texts by Klabunde (*Free Atoms, Clusters, and Nanoscale Particles,* Academic Press, 1994) and by Schmid (*Clusters and Colloids,* VCH Publishers, 1994). These confirm the fact that large scale (greater than 1 gram) syntheses of nanosize metal particles have not been developed, and that only a few large scale syntheses of nanosize ceramics particles have been developed. In addition, these reviews reveal that all reported syntheses of nanosize metal particles give particles that have an isometric morphology (i.e. approximately the same width in any direction, such as spheroidal particles or equiaxial particles). This is a serious limitation since isometric particles cannot be easily aligned by mechanical methods.

Several methods for fabricating objects from nanosize particles are described in the review by Dowding et al. However, these procedures typically involve processing under conditions that produce high temperatures. As a result, the objects that are fabricated are fully sintered objects and not compacts. This is undesirable because the sintering process typically changes the grain size in a compact.

U.S. Pat. No. 5,147,446 to Pechenik and Piermarini describes the use of a diamond anvil press to produce objects or compacts from nanosize particles. The compacts made by this process are not known to exhibit any significant degree of preferred grain orientation. In addition, the compacts made by Pechenik and Piermarini do not consist of anisometric particles. As used herein and in the appended claims, anisometric particles are particles that are not isometric, such anisometric particles having a morphology that is, for example, platelet-like, needle-like, etc.

In the Pechenik and Piermarini disclosure, the amount of material used to make the compacts is not mentioned. However, it is understood that the amount must be minuscule (probably less than 1 mg) because diamond anvil presses, such as the press used in their example, are typically constructed from gem-quality diamonds which are, by their very nature, quite small. In a sense, this is an advantage since nanosize particles are generally available only in small quantities. However, the use of a diamond anvil press does not permit the fabrication of objects of useful dimensions.

Pechenik and Piermarini further claim that it is not possible to compact nanosize particles at room temperature to produce objects with acceptable densities (i.e. greater than 50% of the theoretical value). The reason for this is said to be the propensity for nanosize particles to agglomerate at ambient temperatures to form large aggregates which do not pack well (see column 1, lines 27 through 52). Therefore, Pechenik and Piermarini found it necessary to conduct their process at cryogenic temperatures in order to obtain objects with suitable densities (i.e. greater than 50% of the theoretical value). However, processing at cryogenic temperatures is relatively expensive and can be hazardous.

U.S. Pat. No. 4,771,022 to Block et al. discloses a process for producing compacts from powders which may consist of nanosize particles. However, the process involves the conversion of the nanosize particles into a different polymorph. Thus, the process does not give a nanostructured compact of particles, but rather gives an object with a grain structure which is not directly related to the morphology of the particles used in its fabrication. Moreover, the compacts made by this process are not known to exhibit any significant degree of grain orientation, nor do they consist of anisometric particles.

U.S. Pat. No. 4,921,666 to Ishii, and U.S. Pat. No. 4,744,943 to Timm both disclose processes for producing objects or compacts from powders which may contain nanosize particles. However, these processes involve processing at high temperatures. As a result, the objects that are fabricated are fully sintered objects and not compacts. This is undesirable because the sintering process typically changes the grain size in a compact. In addition, the objects made by Ishii and by Timm are not known to exhibit preferred grain orientation, nor do they consist of anisometric particles.

In all of the references cited above, the powders utilized contain particles having an isometric morphology, that is, particles which have approximately the same width in any direction (i.e. spheroidal particles or equiaxial particles). This is because the syntheses disclosed in the references yield particles that are spheroidal since this shape minimizes surface energy and therefore has the greatest stability. However, spheroidal particles cannot be easily aligned by mechanical methods to give an object which exhibits a preferred grain orientation. This is a significant limitation since preferred grain orientation can result in improved performance in an object.

This invention has therefore as its purpose to provide a process for the production of metal compacts which exhibit preferred grain orientation, as by powder metallurgical methods, wherein the preferred grain orientation is provided by mechanical means. It is another object of the invention to provide for the fabrication of nanostructured metal compacts which exhibit preferred grain orientation, as by powder metallurgical processes.

SUMMARY OF THE INVENTION

In its broadest aspect, the present invention provides for nanostructured metal compacts exhibiting a preferred grain orientation formed from nanosize metal particles, and comprised of metal particles having anisometric morphology. The compact may comprise single phase metal particles (i.e., metal particles comprised of a single element), or may be an alloy, or the metal particles may be admixed with other components thereby resulting in a compact exhibiting heterogenous properties. The nanostructured compacts comprised of the nanosize metal particles and added component(s) exhibit a preferred grain orientation.

The metal particles are compacted, as by a powder metallurgical process, utilizing a relatively high pressure sufficient to form a compact, object, body, article, product or the like, with desired integrity or strength and density. The process utilizes nanosize particles which are anisometric, and during compaction the particles tend to become oriented with their largest dimension perpendicular to the direction of the applied force. Compaction occurs at about ambient temperature, but may be at subambient or elevated temperatures provided this temperature variation does not deleteriously modify the grain structure of the compact.

BRIEF DESCRIPTION OF THE FIGURES

FIG. 3 is a x-ray diffraction pattern of a compact made from nanosize cobalt particles that are anisometric in shape. Enhancement of the 002 peak reveals a preferred grain orientation in this compact.

DETAILED DESCRIPTION OF THE INVENTION

Figure 1:
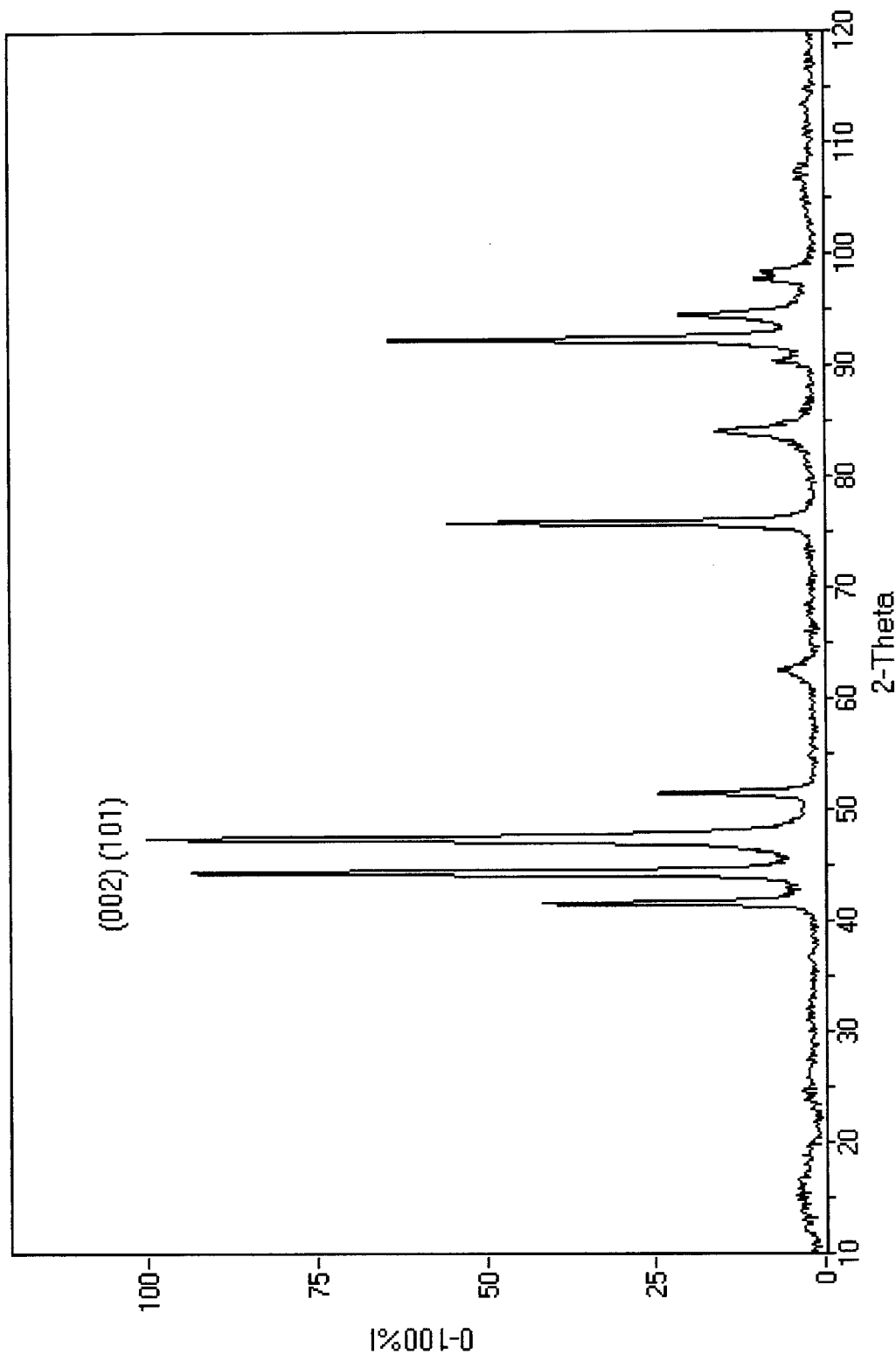
FIG. 1 is an x-ray diffraction pattern of randomly oriented cobalt particles that are greater than 1000 nm in size.

In accordance with this invention, a compact is formed or fabricated, as by powder metallurgical techniques, comprised of nanosize metal particles, which exhibit shape anisotropy. Since such particles are not known to be commercially available at the present time, I have found that the metal particles (or agglomerates or powder formed from particles) can be synthesized by the process described in my co-pending U.S. patent application Ser. No. 08/543,620 filed on Oct. 16, 1995, which is a continuation-in-part of U.S. patent application Ser. No. 08/459,715, filed on Jun. 2, 1995, and incorporated herein by reference, which process yields platelet-like, nanosize particles. It should be understood, however, that the product and method of the present invention is not dependent on the particular process used to synthesize the metal particles (or agglomerates or powder formed from particles), but rather on the properties of the metal particles (or agglomerates or powder formed from particles), and it is expedient to use the process described and claimed in my co-pending application; other known methods that may be used include the chemical reduction of acicular metal oxides, or a comminution process such as ball milling.

My aforesaid referenced patent application discloses a facile procedure for making unsupported base metal particles having anisometric morphology (platelet-like) and further, depending largely upon the base metal salt used in the process and process conditions, the particles exhibit such properties as ferromagnetism, single-domain magnetism, and relatively high aspects (width to thickness ratio). Thus, the process results in the formation of unsupported base metal particles having unique and unexpected properties. The base metals emphasized in the process of my patent application, and therefore the metal recovered from the process as unsupported particles, are the metals selected from the group consisting of iron, cobalt, and nickel.

An aqueous solution of the base metal ion is formed as by dissolving a suitable salt of the base metal in water, as for example the metal chloride or nitrate, e.g., ferrous chloride, ferric chloride, cobalt chloride, and nickel chloride. Where desired, an aqueous suspension of a base metal compound may be first formed, as for example by using a hydroxide of the base metal compound such as cobaltous hydroxide. In some instances where a base metal salt is used, a suspension of the metal hydroxide will form upon the addition of the strong base. The concentration of base metal in solution or in suspension is generally not critical with respect to recovery in that high yields of the product are obtainable. In this regard, however, a suitable soluble salt of the base metal generally affords better control of the process and therefore is preferred.

The solution or suspension of the base metal salt is treated or combined with a strong base and a reducing agent. The order of combining the base metal salt as solution or suspension with the strong base and reducing agent is immaterial, but I have found it more expedient to add the strong base to the solution or suspension of the base metal salt, and to this mixture subsequently add the reducing agent. Strong bases especially suitable for the process include the alkali metal hydroxides, e.g., lithium hydroxide, potassium hydroxide and sodium hydroxide, but alkaline earth hydroxides such as barium hydroxide and strontium hydroxide are also applicable. Sufficient base is used so that the resulting admixture of base metal, base, and reducing agent yields a hydroxide ion concentration of a critical level sufficient to precipitate out the metal particles when the autocatalytic reaction is initiated, and I have found that this level of concentration is generally at least about one-half mole per liter, and preferably at least about one mole per liter having a pH of about 14. The hydroxide ion concentration will depend largely on the base metal and on the specific process conditions employed, but the concentration can be higher which usually results in a faster reaction time in the reduction step to form the particles and also may result in the formation of a smaller and more uniform particle size. For example, in forming particles of cobalt, a hydroxide ion concentration of about three molar or higher is particularly desirable in achieving a high yield and in a reasonable time period.

The order of combining the components is not necessarily critical, and the reducing agent, as a step in the process, may be combined or added to form the admixture. Hydrazine or a hydrazine salt are particularly desirable for use as a reducing agent, because of their availability and ease of control of the process. Also, an organic hydrazine such as methyl hydrazine may be useful. The amount or concentration of reducing agent should be sufficient to reduce most or substantially all of the base metal, which is about the stoichiometric equivalent of reducing agent to metal, but it is preferable to use excess reducing agent. For example, in the case of a base metal with a +2 valance and hydrazine as the reducing agent, for each mole of base metal it is preferable to use at least 2 moles of hydrazine.

The resulting combination or admixture of base metal salt (either as a solution or a suspension) is then subjected to an autocatalytic reaction at about atmospheric or ambient pressure. Accordingly, the self-sustaining or autocatalytic reaction is initiated either by the application of ultrasound (i.e., sonication) or by gentle heating. Sonicators are well known and commercially available, and the full power for a sonicator useful for the process of this invention, as well the percent of power used and time for sonication will vary depending to some extent upon the volume and composition of the material undergoing reduction, which can be determined by one having skill in the art. Sonication can generate some heat and thereby increase the temperature of the solution or suspension being treated, and it therefore may be more desirable to immerse the reactor or vessel containing the reaction contents or mixture in an ice bath in order to maintain an essentially constant temperature during the reduction step. Sonication may be achieved by immersing the sonicator horn or probe directly into the contents of the reactor, or externally by placing the reactor in a suitable bath of water or other liquid, and sonicating the bath.

Where desired, the autocatalytic reduction step may be initiated by gentle heating of the mixture. Heating is generally at a temperature not greater than about the boiling point of the solution (at ambient pressure), or slightly less, usually ranging from about 50–100° C. or slightly higher, preferably at least about 80° C., and may be accomplished by placing a covered container or vessel of the mixture in a steam bath. It should be understood that the boiling point for the solution will vary depending largely upon the components and the concentration. In some cases, it might be desirable to initiate the reaction with a combination of ultrasound and gentle heating.

It will be observed that the concentration of the base metal salt, the concentration of the strong base, the concentration of the reducing agent, and the power and time of sonication may vary. I have found that, when other factors remain constant, a higher base concentration yields a smaller particle size, a higher base metal concentration yields a larger particle size, and longer sonication or high power of sonication yields a smaller particle. Thus, these process conditions can be varied to help control particle size.

When the autocatalytic reduction reaction occurs, as under the influence of sonication or gentle heating, the particles precipitate or flocculate (as may be evidenced by a color change), and under the influence of gravity fall to the bottom of the reactor. The particles are then purified by washing with water. In order to accomplish this step, most of the supernatant is decanted or removed by suitable means such a cannula. The particles are resuspended in water, allowed to settle, and again the supernatant removed. This washing process is repeated until the pH of the removed liquid is about neutral or slightly above. Where desired, washing may be conducted under a protective atmosphere or blanket of an inert gas such as nitrogen. After the final wash, the product may be dried, preferably under vacuum or under a stream of dry nitrogen. It will be observed that the metal particles may oxidize when exposed to air, and therefore a pH of the final wash liquid in the range of between about 7 and 8, indicating a very small residue of reducing agent (e.g., hydrazine), is preferable because this residue acts as an oxygen scavenger and helps to inhibit oxidation. Rather than drying the product, it may be stored under water, or stored under a dilute solution of hydrazine, for later use.

The unsupported base metal particles formed or produced by the process of the present invention have or exhibit an anisometric morphology. That is, the unsupported particles are essentially platelet or disk-shaped, and the particles generally have a maximum size of about 1,000 nm, and an average size of less than about 500 nm, as measured in its longest dimension. Thus, the average particle size may range for the larger dimension from about five to 500 nanometers, but the shape and dimensions can vary depending largely on the concentration of base metal salt, the concentration of strong base, and the sonication conditions, as explained above. Further, the particles have a relatively high aspect (thickness to width ratio) of at least three, and preferably at least about five, but it should be understood that the aspect can be as high as 20 or higher. Particles having a high aspect are considered essential for use in magnetic recording media (e.g., audio tapes, and computer disks), because these particles facilitate alignment of the preferred magnetic axes of the particles, which is an essential feature for acceptable performance. In addition, particles with a high aspect may be useful in powder metallurgical application, as they may facilitate control of grain size and orientation in the finished product. Thus, for example, cobalt particles having a disk-shape have been found to measure about 100 nanometers wide and about 15 nanometers thick, giving an aspect of about six to seven; iron disks measure about 150 to 300 nanometers wide and 30 nanometers thick, giving an aspect of about five to 10; and nickel disks measure about five to 100 nanometers in width and 0.5 to 10 nanometers in thickness, giving an aspect of about 10 to 20. Also, it should be understood that the smaller the particle, in either dimension, the more difficult it is to accurately make these measurements because the particles are not always perfectly flat.

The unsupported base metal particles exhibit ferromagnetic properties, and certain of these particles exhibit a single magnetic domain. These properties can be particularly significant where the particles are used, for example, for fabricating permanent magnets or magnetic storage media.

The unsupported metal particles of iron, cobalt, or nickel produced by this method may be subsequently treated to provide a coating. The coating may be by oxidizing or nitriding the metal particles, or by depositing another element or compound onto the particles, particularly other metals or metal compounds. Transmission electron microscopy has confirmed that the coating does not substantially alter the morphology of the base metal which remains anisometric. For example, the particles can be oxidized in an oxygen-containing atmosphere (e.g., air) at ambient temperature, and the oxide coating will grow progressively thicker as exposure to the air continues, but the metal "core" will remain anisometric. The oxidation process may be accelerated by using oxygen, or by gentle heating such as roasting at 200° C. The oxide coated particles exhibit magnetic properties, i.e., ferromagnetic, and the oxide coating improves the magnetic hardness. The particles may be nitrided, at least partially, as by heating in an atmosphere of nitrogen or ammonia. Where desired, the metal particles can be fully oxidized or nitrided. Also, the base metal particles can be coated with a precious metal such as by admixing in water the metal particles with a dissolved gold acid salt, and on reduction of the gold salt, gold coats the base metal particles.

The base metal particles may be formed into an agglomerate or aggregate, sometimes referred to in the art as a metal powder. For example, the metal particles can agglomerate upon settling or aging, that is by gravity, over a period of time, which can vary depending on concentration, the particular base metal, temperature, and the like. The formation of agglomerates can be facilitated by subjecting the resulting precipitate of base metal to a magnetic field or to centrifugation. Thus, the vessel containing the particles in an aqueous medium can be subjected to a magnetic field such as by sweeping the vessel with a permanent magnet. In this manner, an agglomerate of the metal is formed, which is essentially spherical in shape and may measure in diameter from about 0.1 to 10 microns, but size can vary depending upon such factors as the strength of the field, the condition of application, and the particular metal. Alternatively, the precipitate may be subjected to centrifugation, as for example at about 1,000 to 6,000 rpm for about one to 60 minutes. Here again, the agglomerate is spherical, and the size of the agglomerate can vary. Regardless of the method employed, the resulting agglomerate or powder is washed and dried as described above. Further, the agglomerate generally exhibits random orientation, which means that the base metal platelets that comprise the agglomerate are not preferentially oriented in any particular direction. Where desired, the particles or the resulting agglomerate may be oxidized or nitrided, or coated with another or different metal, e.g. a precious metal, base metal, or lanthanide metal or compound, as explained above. Thus, the particles first formed may be so treated and then the agglomerate formed, or the agglomerate may be first formed and then treated, and both sequence of steps is intended to be included and will depend upon the metal, the final product desired, and the simpler step for the particular embodiment.

The nanosize metal particles used in the fabrication of a compact may be comprised of a single element, for example cobalt, or an alloy, for example an alloy of cobalt and nickel. In addition, the metal particles may be mixed with other components such as other metal particles (including particles of different size or morphology; e.g., spherical platinum nanoclusters), inorganic elements of compounds (e.g., buckminsterfullerene), ceramics (e.g., titania, gamma ferric oxide), polymers (e.g. polystyrene), lubricants (e.g., zinc stearate), binders or thermosetting resins (e.g., epoxy resin), etc. The use of added components, and the relative proportions used, are known techniques in powder metallurgy and related processes where they are used in order to modify or enhance one or more properties of the compact. These techniques are similarly applicable to the present invention and can be determined by one skilled in the art. Thus, the particular added component(s) can be varied, but it is important that the resulting compact comprised of the nanosize metal particles and an added component(s) exhibits a preferred grain orientation. Further, for a compact formed with nanosize metal particles and an added component(s), the metal particles are anisometric, and are present in quantities sufficient to provide for a preferred grain orientation. It should be noted that mixtures of particles may be used to give nanostructured compacts that have unique heterogeneous structures that are not attainable by any other method.

Where desired, an initial alignment of the metal particles can be achieved by applying a shearing force to the metal powder and prior to the compaction step. Mechanical procedures used to apply a shearing force are well known in powder metallurgy technology, but I have found it convenient to apply a shearing force by placing the powder in a cylindrical die and rotating the ram. For the present invention, this initial alignment process improves the uniformity in thickness of the particles in the die thereby resulting in a compact more uniform in thickness as compared to a compact prepared without this initial step. In addition, an initial shearing force achieves a somewhat better preferred grain orientation in the final compact. However, it should be understood that this step is not necessary in the production of a metal compact which exhibits a preferred grain orientation.

If the metal particles are ferromagnetic, an initial alignment of the particles may be achieved by application of an external magnetic field prior to the compaction step. For example, a magnetic field may be applied to the metal particles disposed in the press or die, and it may be desirable to apply a compacting force while applying the magnetic field, but the magnetic field is applied prior to the main compaction step. This pre-step may improve the preferred grain orientation in the final compact. However, it should be understood that this step is not necessary in the production of a metal compact which exhibits a preferred grain orientation.

The metal particles, which may have been pretreated as described above, are compacted by application of pressure in a suitable manner, such as by application of pressure uniaxially with the particles in a die, or isostatically with the particles in a mold. The methods used to compact metal powders is well known in the powder metallurgy field, and although the methods may differ, the important feature is the application of a compressive force to the metal particles. The anisometric particles respond to the compression by aligning themselves in such a way that the pressures on the individual particles are minimized; the particles tend to become oriented with their largest dimension perpendicular to the direction of the applied force. As a result, the compact exhibits a preferred grain orientation.

In accordance with the invention, I have found that the metal particles can be compacted at about ambient temperature. However, it should be understood that compaction at higher or lower temperatures may be desirable. For example, for metals that are extremely ductile, or for some other reason tend to be unusually susceptible to plastic deformation at ambient temperatures, compaction at subambient temperatures may be desirable. Compaction at temperatures above ambient may be desirable in some cases as higher temperatures may improve crystallinity; however, it should be noted that temperatures significantly above ambient may lead to a deleterious modification of the grain structure of the final product or object.

The method of compaction, the pressure used for compaction, and the length of time of compaction should be sufficient to give a final product or object with the desired strength and density. For example, a suitable product has been produced pressing the metal particles in a uniaxial manner, at pressures between 25,000 and 75,000 pounds per square inch, at times ranging from 5 to 30 minutes; however, much higher pressures and times are also applicable to the process of this invention, and depend upon such factors as the material being used, the method of compaction, and the end product sought. The conditions employed should result in a compact that has strength sufficient to allow for handling, and a preferred grain orientation.

If desired, the metal compact may be subjected to a thermal processing step, either during or after compaction, in order to improve or modify its characteristics. For example, the object may be heated to a moderate temperature so as to improve crystallinity without significantly altering the grain structure. Moderate heating may be in the range of from about 150–500° C., but this heating step is dependent largely upon the material used, the history, and the particle size. Heating to higher temperatures may be desirable to improve strength and density, or to modify the grain structure.

Thus, the present invention is advantageous in that it utilizes anisometric nanosize metal particles to produce compacts which exhibit a preferred grain orientation, and have useful strength and density. Further, it will be observed that my invention is useful because it allows for the fabrication of nanostructured compacts with a preferred grain orientation, and nanostructured compacts with unique heterogeneous compositions. It is significant that these compacts may exhibit physical properties that differ from compacts made by conventional powder metallurgical methods, and that these properties may be useful.

The following examples illustrate the novel compacts of this invention, and the method by which these compacts are obtained; however, these examples are illustrative only and are not intended to limit the invention claimed.

EXAMPLE 1

Synthesis of Anisometric Nanosize Cobalt Particles.

A 5.1 gram (g) sample of cobalt chloride hexahydrate was dissolved in 100 milliliters (mL) of water. The resulting solution was divided into five portions, each containing 20 mL of solution, which were placed into 250 mL beakers. To each of these solutions was added 80 mL of water and 100 mL of 50% by weight aqueous sodium hydroxide. Each solution was mixed with a glass stir rod and cooled in an ice bath.

A 300 watt sonicator from Fisher Scientific Company was fitted with a ¾ inch titanium horn. The titanium horn of the sonicator was inserted into one of five solutions described above. The sonicator power supply was then turned to 90% of full power for one minute. This resulted in the conversion of the cobalt chloride to nanosize particles of cobalt metal, which were suspended in solution. The resulting suspension was transferred to a 2000 mL round bottom flask. The sonication step was repeated for the remaining four solutions, and the products were combined in the same 2000 mL round bottom flask. About 1000 mL of water was then added to the flask.

Upon ageing, the cobalt particles formed a floc which slowly settled out of solution. The floc was washed by removing most of the liquid from the flask, and then adding about 250 mL of fresh water. The washing process was repeated until the pH of the supernatant was between 7 and 8. The floc was then washed twice in a similar way, but using 50 mL of acetone each time. After the final wash, a silver-gray powder, wet with acetone, was obtained. This was dried under vacuum to give 1.1 g of nanosize cobalt powder.

Examination of this powder by transmission electron microscopy confirmed that it consisted of anisometric nanosize cobalt particles which averaged about 100 nm in width and 15 nm in thickness. Analysis by electron diffraction indicated that the individual particles were crystalline with hexagonal crystallographic symmetry. Furthermore, electron diffraction indicated that the particles had crystallized as (001) platelets, which means that the unique axis of the hexagonal crystallographic cell was perpendicular to the plane of the platelet. Knowledge of the crystallographic features of the individual platelets was valuable in that it could be correlated with results from the x-ray diffraction study of the compacts.

Fabrication of a Nanostructured Metal Compact from Anisometric Nanosize Cobalt Particles.

Nanosize cobalt particles, synthesized as described above, were placed in a ½ inch diameter cylindrical stainless-steel die which was obtained from Beckman Instruments, Inc. The ram was placed into the die and slowly lowered onto the particles. The ram was then rotated by hand in order to disperse the particles and obtain a uniform sample depth. (This step also results in some degree of particle alignment). The die was then evacuated.

The nanosize metal particles were uniaxially pressed by placing the die in a hydraulic press which held the ram fixed and applied a force to the bottom of the die. A force of 15,000 pounds was applied. This corresponded to a pressure of about 75,000 pounds per square inch applied by the ram to the powder. The force on the die was maintained for 15 minutes. After pressing, the compact, in the form of a somewhat brittle silver pellet, was removed. The ½ inch (1.27 cm) diameter pellet had a thickness of 0.20 cm and a mass of 1.30 grams. This corresponded to a density of 5.1 g/cm$^3$, which was 58% of the density for bulk cobalt, and quite typical of densities observed for compacts made by conventional powder metallurgical methods.

Characterization of the Nanostructured Metal Compact by X-Ray Diffraction Methods.

The metal compact was analyzed by x-ray diffraction methods and compared to control samples in order to determine its composition, and whether the sample exhibits any degree of preferred grain orientation. The composition of the compact was revealed primarily by the location of the peaks in the x-ray diffraction pattern, and comparison of those peak positions with the peak positions from an x-ray diffraction pattern of an authentic sample. Preferred grain orientation is revealed by an unusual increase in relative intensity of one or more peaks in the diffraction pattern of the compact when compared to a diffraction pattern of a randomly oriented sample. Details concerning the use of x-ray diffractometry to determine the composition of a sample, and to determine whether the sample exhibits preferred grain orientation (texturing) is well know to those versed in the field, and can be found in advanced textbooks on the subject. A recent example in which x-ray diffraction methods were used in a similar way to reveal grain orientation can be found in a report by Kawamata et al. (*Journal of Materials Research,* Vol 10, pp 2444–2448). All diffraction patterns were obtained on a Rigaku D/Max-2000 series x-ray diffractometer operating in the theta-theta mode using monochromated radiation from a copper target x-ray tube.

As a control sample, a sample of cobalt powder was obtained from Aldrich Chemical Company. Electron microscopy of this material revealed that the particles were typically between 1 and 3 microns in size, and had an isotropic (spheroidal) shape. The isotropic shape of the particles is significant because it means that they are likely to be randomly oriented (i.e. no preferred grain orientation) as a loose powder. An x-ray diffraction pattern of a this control sample, as a loose powder, was collected. This control pattern is shown in FIG. 1. For all peaks with significant intensity (i.e. intensities greater than 10% of the most intense peak), the crystallographic indices which described the crystallographic features giving rise to the peak were determined. Peak indices confirmed that the sample consisted of the hexagonal close packed allotrope of cobalt. This control sample may be considered to be an authentic sample of cobalt with randomly oriented grains.

Figure 2:
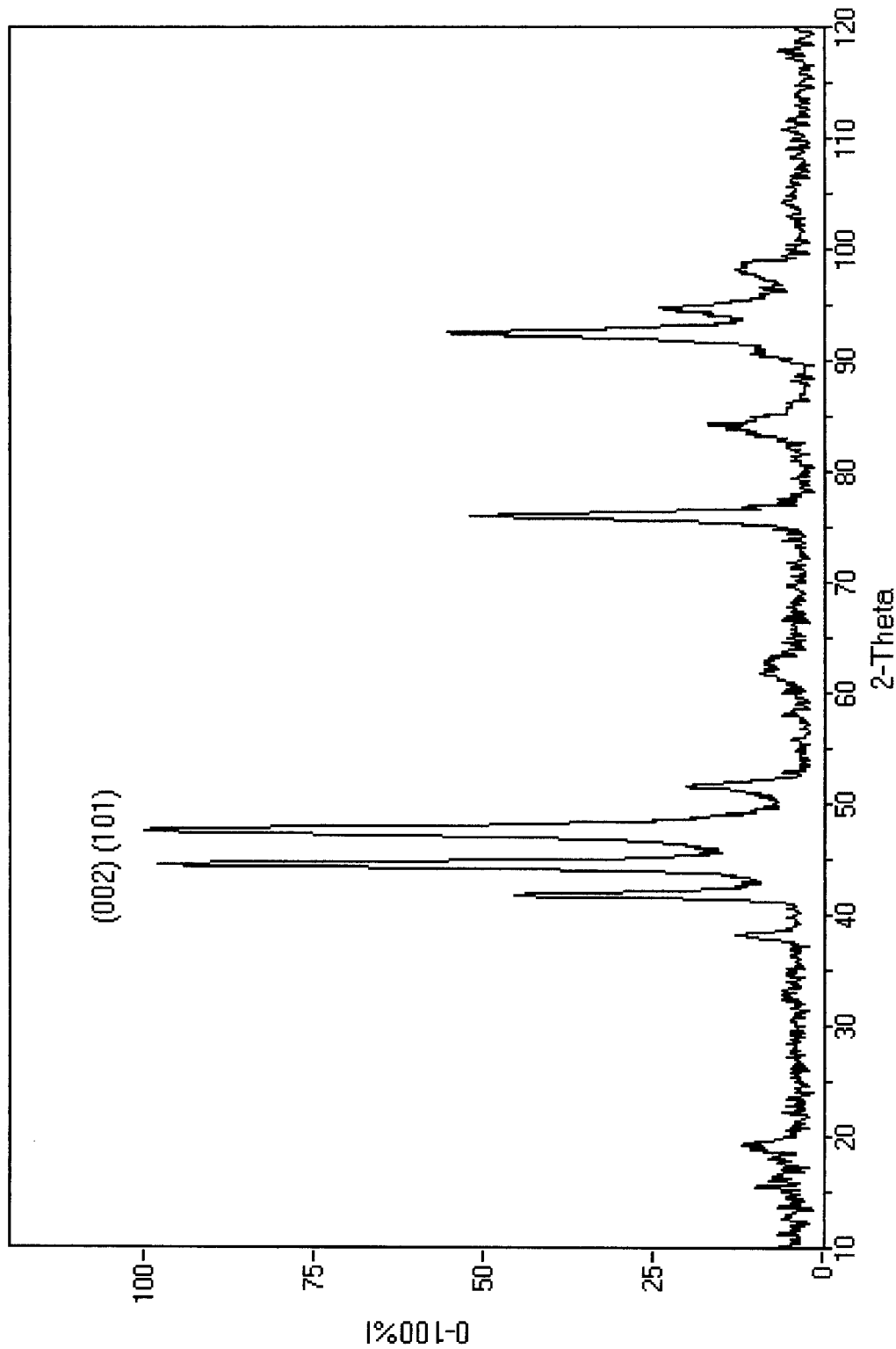
FIG. 2 is a x-ray diffraction pattern of randomly oriented nanosize cobalt particles that are anisometric in shape. The individual particles are platelets that average about 100 nm in width and 15 nm in thickness.

Next, nanosize cobalt particles made in accordance with this example, as a loose (i.e. not compacted) powder were analyzed by x-ray diffractometry. The x-ray diffraction pattern of this sample, shown in FIG. 2, is virtually indistinguishable from the x-ray diffraction pattern of the control. This indicates that the anisometric nanosize cobalt particles used in the compaction studies also consisted of the hexagonal close packed allotrope of cobalt. This further indicates that the particles are randomly oriented in the loose powder despite the fact that the individual particles are anisometric.

The compact was then characterized by an x-ray diffraction analysis. For this analysis, the compact was positioned in the x-ray diffractometer so that its surface was oriented at an angle of 0 degrees in theta as measured with respect to the goniometer. The x-ray diffraction pattern of the compact was then obtained under conditions identical to those used for the control.

The diffraction pattern from the compact is shown in FIG. 3. It will be noted that the number and location of peaks with significant intensity are the same in the x-ray diffraction pattern for the compact and the x-ray diffraction pattern for the control. This confirms that the compact is composed of the hexagonal close packed allotrope of cobalt. However, the relative intensities of the peaks in the two patterns are different. In the diffraction pattern of the compact (FIG. 3), the peak located at 44.8 degrees in two-theta, which was indexed as the 002 reflection, shows significant enhancement relative to the peaks in the diffraction pattern of the control (FIG. 1). All other peaks in the diffraction patterns show the same relative intensities. The enhancement of the 002 reflection in the diffraction pattern of the compact is clear evidence of preferred grain orientation in the compact. The fact that only the 002 peak was enhanced indicated that the randomly oriented cobalt platelets that had comprised the loose nanosize powder, which are known from electron diffraction studies to have a (001) crystallographic morphology, had become oriented during the pressing in such a way that the platelets were perpendicular to the direction of the applied force. In other words, compressing the cobalt platelets caused them to lie flat.

The degree of preferred grain orientation in the compact was determined from the intensity ratios of the peaks located at 44.8 degrees and 47.8 degrees (indexed as the 002 and 101 peaks, respectively). In the diffraction pattern of the randomly oriented control, the ratio was 0.59. This means that the diffraction pattern of a randomly oriented sample will exhibit both the 002 reflection and the 101 reflection, and that ratio of their intensities will be 0.59 to 1. However, only the 002 peak should be observed for a sample with perfect grain orientation (i.e., 100% preferred grain orientation). As a consequence, the percent preferred grain orientation can be determined from the following relationship:

$$\%ORI = 100 \times [I_{002} - (0.59 \times I_{101})]/I_{002}$$

In this equation, %ORI means percent preferred grain orientation, $I_{002}$ refers to the intensity of the 002 peak, and $I_{101}$ refers to the intensity of the 101 peak. It can be seen from this equation that sample with random orientation will have 0% preferred grain orientation, and a perfectly aligned sample will have 100% preferred grain orientation. The metal compact made in this example had a preferred grain orientation of 74%.

EXAMPLE 2

Nanosize cobalt particles were prepared, pressed, and analyzed in the same manner as described in example 1, except that a force of 10,000 pounds (corresponding to a pressure of 50,000 pounds per square inch) was used. The resulting pellet had a density of 4.5 g/cm³. The degree of preferred grain orientation was determined to be 73%.

EXAMPLE 3

Nanosize cobalt particles were prepared, pressed, and analyzed in the same manner as described in example 1, except that a force of 5,000 pounds (corresponding to a pressure of 25,000 pounds per square inch) was used. The resulting pellet had a density of 3.6 g/cm³. The degree of preferred grain orientation was determined to be 50%.

EXAMPLE 4

50 mg of zinc stearate was dissolved in 50 mL of toluene in a 250 mL round bottom flask. A 1 gram sample of nanosize cobalt particles, synthesized as described in example 1, was added to the flask. The contents of the flask were mixed by shaking. The toluene was then removed by evaporation at ambient temperature using a Buchi rotary evaporator. After evaporation of the solvent, a uniform gray mixture of zinc stearate (4.8% by weight) and cobalt (95.2% by weight) was obtained. This mixture was pressed and analyzed in the same manner as described in example 1. The resulting pellet had a density of 5.0 g/cm³. The degree of preferred grain orientation (for the cobalt grains) was determined to be 66%.

EXAMPLE 5

A mixture of zinc stearate and nanosize cobalt particles was prepared, pressed, and analyzed in exactly the same manner as described in example 4, except that 10 mg of zinc stearate was used. This gave a mixture that was 1.0% by weight zinc stearate and 99.0% by weight cobalt. The resulting pellet had a density of 5.0 g/cm. The degree of preferred grain orientation (for the cobalt grains) was determined to be 65%.

EXAMPLE 6

Nanosize cobalt particles were prepared, pressed, and analyzed in the same manner as described in example 1, except a 25 mg sample of the powder (rather than a 1 g sample) was pressed. The degree of preferred grain orientation was determined to be 76%.

Magnetic measurements of the disk were obtained on a SQUID magnetometer at the University of Nebraska. The disk exhibited anisotropic magnetic behavior. Specifically, the coercivity was 416 Oersteds when measured perpendicular to the plane of the disk, and 227 Oersteds in the plane of the disk, and this anisotropic coercivity may be desirable, for example in the fabrication of magnetic storage media or permanent magnets.

I claim:

1. A nanostructured metal compact exhibiting a preferred grain orientation and comprised of nanosize metal particles having an anisometric morphology.

2. A nanostructured metal compact according to claim 1 wherein said metal particles have an average size not greater than about 500 nanometers.

3. A nanostructured metal compact according to claim 2 wherein said particles have ferromagnetic properties.

4. A nanostructured metal compact according to claim 1 wherein said compact has incorportated therein one or more added components.

5. A nanostructured metal compact according to claim 4 wherein said added component is selected from the group consisting of an inorganic element, an inorganic compound, a lubricant, a thermosetting resin, a polymer, and a binder.

6. A nanostructured metal compact according to claim 1 wherein said metal particles comprise cobalt.

7. A nanostructured metal compact according to claim 6 wherein said cobalt is alloyed.

8. A nanostructured metal compact according to claim 7 wherein said alloy comprises cobalt and nickel.

9. A nanostructured metal compact according to claim 1 wherein said degree of grain orientation is at least about 50%.

10. A nanostructured metal compact according to claim 1 wherein said metal particles comprise cobalt having an average size of not greater than about 500 nanometers, and said compact has incorporated therein one or more added components.

11. A method of forming a nanostructured metal compact comprising: (a) forming unsupported, nanosize metal particles having an anisometric morphology and (b) compacting the particles under sufficient pressure to form a body of integrity and exhibiting a preferred grain orientation.

12. A method of forming a nanostructured metal compact according to claim 11 further including allowing said metal particles to form an agglomerate prior to step (b), and compacting the resulting agglomerate.

13. A method of forming a nanostructured metal compact according to claim 11 wherein said metal particles have an average size not greater than about 500 nanometers.

14. A method of forming a nanostructured metal compact according to claim 11 further including the step of applying a shearing force to said particles prior to step (b).

15. A method of forming a nanostructured metal compact according to claim 13 further including the step of applying a shearing force to said particles prior to step (b).

16. A method of forming a nanostructured metal compact according to claim 11 further including the step of applying an external magnetic field to said particles prior to step (b).

17. A method of forming a nanostructured metal compact according to claim 13 further including the step of applying an external magnetic field to said particles prior to step (b).

18. A method of forming a nanostructured metal compact according to claim 11 wherein said compacting is conducted at about ambient temperature.

19. A nanostructured metal compact exhibiting a preferred grain orientation and comprised of nanosize metal particles, said compact formed by the process of (a) preparing unsupported base metal particles having a maximum size in its longest dimension of not greater than about 1000 nanometers, and exhibiting anisometric morphology, and (b) compacting the particles under sufficient pressure to form a body of integrity and exhibiting a preferred grain orientation.

20. A nanostructured metal compact according to claim 19 wherein said metal particles have an average size not greater than about 500 nanometers.

21. A nanostructured metal compact according to claim 19 or claim 20 wherein said particles have ferromagnetic properties.

22. A nanostructured metal compact according to claim 21 wherein wherein said metal particles comprise cobalt or an alloy of cobalt.

* * * * *